US012779261B2

(12) United States Patent
Robin

(10) Patent No.: US 12,779,261 B2
(45) Date of Patent: Nov. 3, 2026

(54) THERMAL PROTECTION OF LITHIUM ION BATTERIES

(71) Applicant: THE CHEMOURS COMPANY FC, LLC, Wilmington, DE (US)

(72) Inventor: Mark L. Robin, Middletown, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 783 days.

(21) Appl. No.: 18/034,666

(22) PCT Filed: Oct. 28, 2021

(86) PCT No.: PCT/US2021/056951
§ 371 (c)(1),
(2) Date: Apr. 28, 2023

(87) PCT Pub. No.: WO2022/197332
PCT Pub. Date: Sep. 22, 2022

(65) Prior Publication Data

US 2023/0398385 A1 Dec. 14, 2023

Related U.S. Application Data

(60) Provisional application No. 63/163,390, filed on Mar. 19, 2021.

(51) Int. Cl.

| | |
|---|---|
| ***A62C 3/16*** | (2006.01) |
| ***A62C 31/02*** | (2006.01) |
| ***A62C 37/14*** | (2006.01) |
| ***A62D 1/00*** | (2006.01) |

(52) U.S. Cl.
CPC ................ *A62C 3/16* (2013.01); *A62C 31/02* (2013.01); *A62C 37/14* (2013.01); *A62D 1/0092* (2013.01)

(58) Field of Classification Search
CPC ........... A62C 3/16; A62C 31/02; A62C 37/14; A62C 35/10; A62C 35/68; A62D 1/0092; A62D 1/0057; Y02E 60/10
See application file for complete search history.

(56) References Cited

U.S. PATENT DOCUMENTS

| | | | | |
|---|---|---|---|---|
| 6,889,775 | B2 * | 5/2005 | Shaw ................. | A62C 99/0018 169/46 |
| 7,823,650 | B2 | 11/2010 | Eckholm | |
| 12,407,064 | B2 | 9/2025 | Lee | |
| 2008/0026297 | A1 | 1/2008 | Chen | |
| 2010/0078182 | A1 | 4/2010 | Alkemade | |

(Continued)

FOREIGN PATENT DOCUMENTS

| | | | | |
|---|---|---|---|---|
| CN | 106537642 A * | 3/2017 | .......... | H01M 50/417 |
| CN | 206167681 U | 5/2017 | | |

(Continued)

OTHER PUBLICATIONS

English translation CN_106537642 (Year: 2017).*
English translation CN_211357525 (Year: 2020).*
NOVEC 1230 (Year: 2012).*

*Primary Examiner* — Qingzhang Zhou

(57) ABSTRACT

A method for extinguishing a flame and terminating thermal runaway in a device powered by a lithium ion battery. The disclosure also provides a system for extinguishing fires generated by lithium ion batteries exhibiting thermal runaway.

13 Claims, 6 Drawing Sheets

(56) References Cited

U.S. PATENT DOCUMENTS

| | | | | |
|---|---|---|---|---|
| 2010/0263882 | A1 * | 10/2010 | Bodemann | F16K 15/04 137/15.04 |
| 2010/0263885 | A1 | 10/2010 | Tuma | |
| 2017/0328799 | A1 | 11/2017 | Stilwell | |
| 2018/0346677 | A1 | 12/2018 | Kikuchi | |

FOREIGN PATENT DOCUMENTS

| | | | |
|---|---|---|---|
| CN | 206560619 | U | 10/2017 |
| CN | 206995642 | U | 2/2018 |
| CN | 109011263 | A | 12/2018 |
| CN | 106469794 | B | 10/2019 |
| CN | 210503141 | U | 5/2020 |
| CN | 211357525 | U * | 8/2020 |
| CN | 111790083 | A | 10/2020 |
| CN | 109718490 | B | 3/2021 |
| CN | 110433419 | B | 9/2021 |
| CN | 110600638 | B | 5/2022 |
| JP | 3160699 | B2 | 4/2001 |
| JP | 2003117021 | A | 4/2003 |
| JP | 2015156947 | A | 9/2015 |
| JP | 2018153463 | A | 10/2018 |
| JP | 2019213957 | A | 12/2019 |
| WO | 201078182 | W | 7/2010 |
| WO | 201951389 | A1 | 3/2019 |
| WO | 2019113052 | A1 | 6/2019 |
| WO | 2020054306 | A1 | 3/2020 |

* cited by examiner

THERMAL PROTECTION OF LITHIUM ION BATTERIES

CROSS REFERENCE TO RELATED APPLICATIONS

This application is a national filing under 35 U.S.C. 371 of International Application No. PCT/US2021/056951 filed Oct. 28, 2021, and claims priority of U.S. Provisional Application No. 63/163,390 filed Mar. 19, 2021, the disclosures of which are incorporated herein by reference in its entirety.

TECHNICAL FIELD

The present disclosure relates to protection of lithium ion batteries from thermal events, including extinguishing flames and terminating thermal runaway.

BACKGROUND

It is generally accepted within the specialty fire suppression industry that gaseous clean fire extinguishing agents such as 1,1,1,2,3,3,3-heptafluoropropane ($CF_3CHFCF_3$, also known by the ASHRAE designation HFC-227ea and sold as FM-200™ fire suppression agent) and dodecafluoro-2-methylpentan-3-one, which is 1,1,1,2,2,4,5,5,5-nonafluoro-4-(trifluoromethyl)-3-pentanone ($CF_3CF_2C(=O)CF(CF_3)_2$, also known by the ASHRAE designation as FK-5-1-12, and sold as Novec™ 1230 fire protection fluid, are incapable of terminating thermal runaway, especially cascading thermal runaway, associated with lithium ion battery (LIB) fires in currently available methods and systems, and are limited only to the extinguishment of the liquid electrolyte fires associated with LIBs. For example, Ingram disclosed in "Lithium-Ion Batteries: A Potential Fire Hazard" (Data Center Journal, 2013), "Gaseous agents will extinguish flames due to burning leaked electrolyte but have little or no effect on mitigating or preventing a thermal runaway occurring within Li-ion cells." More recently, Ingram disclosed in "Fire Suppression for Lithium Ion Battery Fires" presented at the Fire Suppression System Association's Annual Meeting in 2019, "thermal runaway . . . cannot be controlled by any suppression system."

U.S. 2010/0078182 discloses a device for generating and storing electrical or mechanical energy, such as a fuel cell, regular battery or rechargeable battery, and method for fire avoidance. At least one element of the device serving to generate or store electrical or mechanical energy is disposed within an encapsulation. A container storing a flame-retardant substance is in contact with the encapsulation. If multiple cells are present, the system does not isolate cells from one another to prevent damage to other cells. Furthermore, this system has no method for activating in the presence of open flame. US 2010/0078182 recites flame extinguishment, but fails to address termination of thermal runaway.

CN206167681 discloses a device to protect a lithium ion battery in an automobile from fire, which involves use of a fire detection/delivery tube located within a battery case enclosing the battery. A fire extinguishing agent can be heptafluoropropane. A pressure signal sensor is installed on the fire extinguishing agent conveying and fire detecting tube inside the battery case. CN206167681 recites fire extinguishment, but fails to address termination of thermal runaway.

U.S. Pat. No. 7,823,650 discloses a hazard control system to deliver a fire extinguishing agent in response to detection of a hazard, such as a fire. The system may use a pressure tube configured to leak in response to exposure to heat. The elements of the system include (1) a control unit, (2) a fire extinguishing agent; (3) a hazard detection system and (4) a hazard area and (5) a delivery system which delivers the fire extinguishing agent to the hazard area. The hazard detection system generates a signal in response to detecting a hazard such as a change in pressure in a pressure tube. U.S. Pat. No. 7,823,650 recites a fire control system, but fails to address how to extinguish a fire or how to terminate thermal runaway.

A need remains to address the thermal protection needs associated with lithium ion batteries, including termination of thermal runaway, and extinguishing flames as well as preventing reignition of an extinguished fire. The present disclosure meets these needs.

SUMMARY

The present disclosure provides a method for extinguishing a flame and terminating thermal runaway in a device powered by a lithium ion battery. The method comprises: (a) providing an enclosure; (b) providing a device positioned within the enclosure, wherein the device comprises and is powered by a lithium ion battery; (c) providing a source of a thermal runaway termination agent, wherein the source comprises a container and a two-way control valve, wherein the container contains the thermal runaway termination agent, the two-way control valve is attached to an opening in the container, and the thermal runaway termination agent comprises dodecafluoro-2-methylpentan-3-one; (d) providing a temperature sensitive tube containing an inert gas or a thermal runaway termination agent at a predetermined pressure and temperature suitable for normal operating conditions of the device, wherein the tube has two ends, wherein (i) one end is in communication with the two-way control valve and the other end is capped, (ii) the tube is located within the enclosure and comprises a temperature sensor for detection of a threshold temperature, and (iii) the tube is disposed in proximity to the lithium ion battery; and (e) providing a heat stimulus, which generates a flame and initiates thermal runaway, whereupon the temperature sensitive tube ruptures, creating an opening in the temperature sensitive tube ("heat stimulus-created opening") and causing release of the inert gas or thermal runaway termination agent within the temperature sensitive tube through the heat stimulus-created opening in the temperature sensitive tube and into the enclosure, resulting in a pressure drop within the temperature sensitive tube which actuates the two-way control valve to deliver the thermal runaway termination agent from the storage container through the two-way control valve to the temperature sensitive tube and out of the heat stimulus-created opening in the temperature sensitive tube and into the enclosure; wherein the delivery of the thermal runaway termination agent is characterized by a discharge time, a thermal runaway termination agent concentration, and hold time, thereby extinguishing the flame and terminating thermal runaway and preventing reignition following the extinguishment of the flame.

There is also provided a method for extinguishing a flame and terminating thermal runaway in a device powered by a lithium ion battery, which comprises: (a) providing an enclosure; (b) providing a device positioned within the enclosure, wherein the device comprises and is powered by a lithium ion battery; (c) providing a source of a thermal runaway termination agent, wherein the source comprises a container and a three-way control valve, wherein the container contains the thermal runaway termination agent, the three-way control valve is attached to an opening in the container, and the thermal runaway termination agent comprises dodecafluoro-2-methylpentan-3-one; (d) providing a temperature sensitive tube containing an inert gas or a thermal runaway termination agent at a predetermined pressure and temperature suitable for normal operating conditions of the device, wherein the tube has two ends, wherein (i) one end is in communication with the three-way control valve and the other end is capped, (ii) the tube is located within the enclosure and comprises a temperature sensor for detection of a threshold temperature, and (iii) the tube disposed in proximity to the lithium ion battery; (e) providing a nozzle-connecting tube which is in communication with the three-way control valve on one end and terminates in a nozzle proximal to the lithium ion battery at the other end of the nozzle-connecting tube; and (f) providing a heat stimulus, which generates a flame and initiates thermal runaway, whereupon the temperature sensitive tube ruptures, creating an opening in the temperature sensitive tube ("heat stimulus-created opening") and causing release of the inert gas or thermal runaway termination agent within the temperature sensitive tube through the heat stimulus-created opening in the temperature sensitive tube and into the enclosure, resulting in a pressure drop within the temperature sensitive tube which actuates the three-way control valve to deliver the thermal runaway termination agent from the storage container through the three-way control valve to the nozzle-connecting tube, resulting in the release of the thermal runaway termination agent from the nozzle into the enclosure; wherein the delivery of the thermal runaway termination agent is characterized by a discharge time, a thermal runaway termination agent concentration, and hold time, thereby extinguishing the flame and terminating thermal runaway and preventing reignition following the extinguishment of the flame.

The concentration, discharge time and hold time of the thermal runaway termination agent within the enclosure provides the following advantages over existing systems: (1) extinguishes a flame once a flame has generated; (2) terminates thermal runaway occurring in a single cell lithium ion battery or in a multiple cell lithium ion battery or in a lithium ion battery bank, and (3) prevents reignition from occurring after flame has been extinguished.

There is also provided a fire protection system which comprises: (a) an enclosure; (b) a device, positioned within the enclosure, wherein the device comprises and is powered by a lithium ion battery; (c) a source of a thermal runaway termination agent, wherein the source comprises a container and a two-way control valve, wherein the container contains the thermal runaway termination agent, the two-way control valve is attached to an opening in the container, and the thermal runaway termination agent comprises dodecafluoro-2-methylpentan-3-one; and (d) a temperature sensitive tube containing an inert gas or a thermal runaway termination agent at a predetermined pressure and temperature suitable for normal operating conditions of the device, wherein the tube has two ends, wherein (i) one end is in communication with the two-way control valve and the other end is capped, (ii) the tube is located within the enclosure and comprises a temperature sensor for detection of a threshold temperature, and (iii) the tube is disposed in proximity to the lithium ion battery, and the tube is burstable upon sensing a threshold temperature.

There is also provided a fire protection system which comprises: (a) an enclosure; (b) a device, positioned within the enclosure, wherein the device comprises and is powered by a lithium ion battery; (c) a source of a thermal runaway termination agent, wherein the source comprises a container and a three-way valve, wherein the container contains the thermal runaway termination agent, the three-way control valve is attached to an opening in the container, and the thermal runaway termination agent comprises dodecafluoro-2-methylpentan-3-one; and (d) a temperature sensitive tube containing an inert gas or a thermal runaway termination agent at a predetermined pressure and temperature suitable for normal operating conditions of the device, wherein the temperature sensitive tube has two ends, wherein (i) one end is in communication with the three-way control valve and the other end is capped, (ii) the temperature sensitive tube is located within the enclosure and comprises a temperature sensor for detection of a threshold temperature, and (iii) the temperature sensitive tube disposed in proximity to the lithium ion battery, and the temperature sensitive tube is burstable upon sensing a threshold temperature; and (e) a nozzle-connecting tube which is in communication with the three-way control valve on one end and terminates in a nozzle proximal to the lithium ion battery at the other end of the nozzle-connecting tube.

Other features will be apparent to those skilled in the art based on this disclosure.

In accordance with the present disclosure, a problem of lithium ion batteries is that fire extinguishing agents are incapable of terminating thermal runaway and that thermal runaway cannot be terminated by any suppression system is addressed. It is by selection of a particular thermal runaway termination agent and administration of the agent for a particular discharge time, at a particular concentration and hold time within a device powered by a lithium ion battery, that not only extinguish a flame within the device (initial extinguishment), but also terminate thermal runaway and prevent reignition following initial extinguishment of flames.

DETAILED DESCRIPTION

Figure 1A:
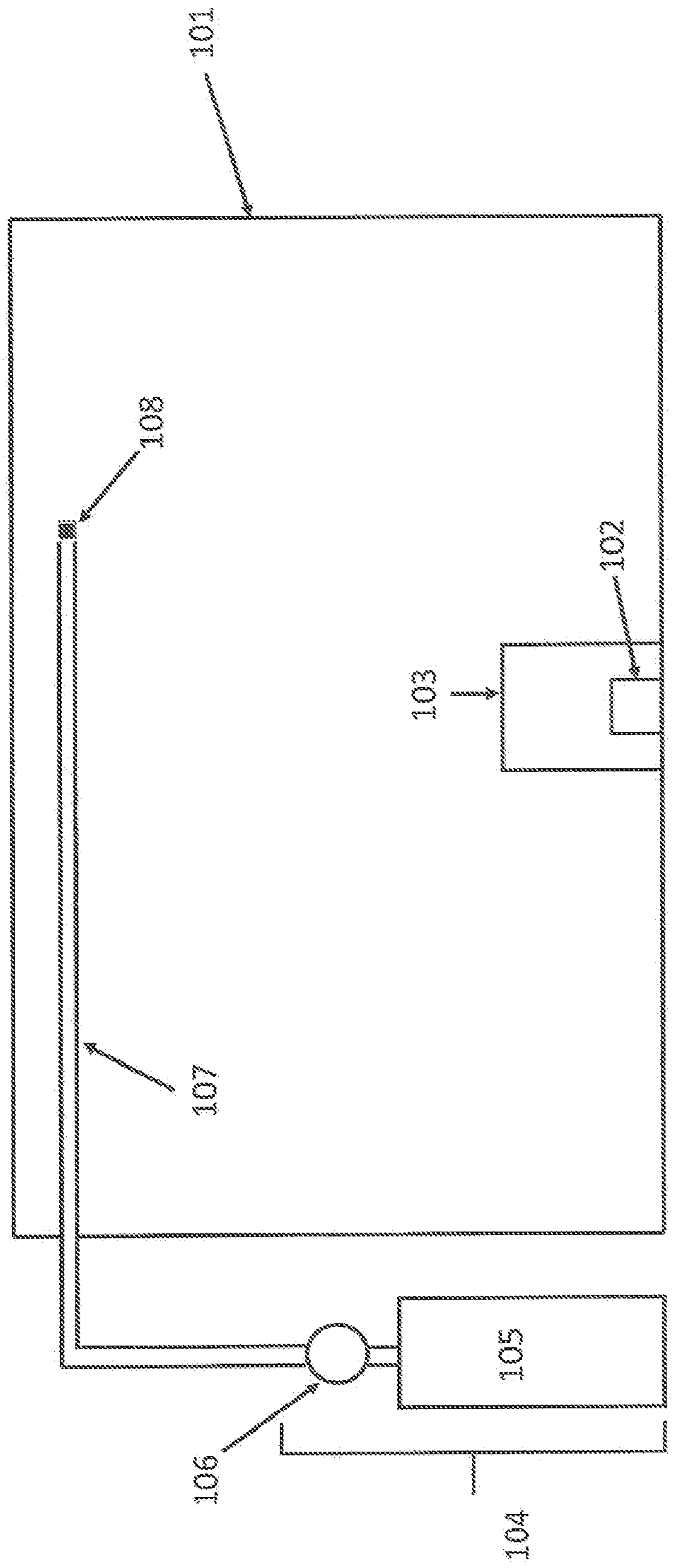
FIGS. 1*a* and 1*b* are illustrations of one embodiment of a LIB protection system of the present disclosure.

Dodecafluoro-2-methylpentan-3-one (the IUPAC name) may be referred to hereunder by the ASHRAE, NFPA and ISO 14520 designations FK-5-1-12. Dodecafluoro-2-methylpentan-3-one is also known as 1,1,1,2,2,4,5,5,5-nonafluoro-4-(trifluoromethyl)-3-pentanone and has the formula, $(CF_3CF_2C(=O)CF(CF_3)_2$. The terms dodecafluoro-2-methylpentan-3-one, FK-5-1-12, 1,1,1,2,2,4,5,5,5-nonafluoro-4-(trifluoromethyl)-3-pentanone and Novec™ 1230 fire protection fluid are meant to be understood herein as synonymous.

Methods for Extinguishing a Flame and Terminating Thermal Runaway

Embodiment 1

In certain embodiments of this disclosure, there is provided a method for extinguishing a flame and terminating thermal runaway in a device comprising (a) providing an enclosure; (b) providing a device positioned within the enclosure, wherein the device comprises and is powered by a lithium ion battery; (c) providing a source of a thermal runaway termination agent, wherein the source comprises a container and a two-way control valve, wherein the container contains the thermal runaway termination agent, the two-way control valve is attached to an opening in the container, and the thermal runaway termination agent comprises dodecafluoro-2-methylpentan-3-one; (d) providing a temperature sensitive tube containing an inert gas or a thermal runaway termination agent at a predetermined pressure and temperature suitable for normal operating conditions of the device, wherein the tube has two ends, wherein (i) one end is in communication with the two-way control valve and the other end is capped, (ii) the tube is located within the enclosure and comprises a temperature sensor for detection of a threshold temperature, and (iii) the tube is disposed in proximity to the lithium ion battery; and (e) providing a heat stimulus, which generates a flame and initiates thermal runaway, whereupon the temperature sensitive tube ruptures, creating an opening in the tube (heat stimulus-created opening) and causing release of the inert gas or thermal runaway termination agent within the temperature sensitive tube through the heat stimulus-created opening in the temperature sensitive tube and into the enclosure, resulting in a pressure drop within the temperature sensitive tube which actuates the two-way control valve to deliver the thermal runaway termination agent from the storage container through the two-way control valve to the temperature sensitive tube and out of the heat stimulus-created opening in the temperature sensitive tube and into the enclosure; wherein the delivery of the thermal runaway termination agent is characterized by a discharge time, a thermal runaway termination agent concentration, and hold time, thereby extinguishing the flame and terminating thermal runaway and preventing reignition following the extinguishment of the flame.

The two-way control valve is in sensor communication with the temperature sensitive tube. In this embodiment, the temperature sensitive tube is in fluid communication with the source through the two-way control valve such that when the two-way control valve is actuated, the thermal runaway termination agent is delivered to the temperature sensitive tube. In this embodiment the temperature sensitive tube acts to both detect the heat stimulus and to deliver the thermal runaway termination agent into the enclosure.

In one method under Embodiment 1, in step (d), the temperature sensitive tube contains an inert gas. In an alternative method under Embodiment 1, in step (d), the temperature sensitive tube contains a thermal runaway termination agent.

Embodiment 2

There is also provided a method for extinguishing a flame and terminating thermal runaway in a device powered by a lithium ion battery that comprises (a) providing an enclosure; (b) providing a device positioned within the enclosure, wherein the device comprises and is powered by a lithium ion battery; (c) providing a source of a thermal runaway termination agent, wherein the source comprises a container and a three-way control valve, wherein the container contains the thermal runaway termination agent, the three-way control valve is attached to an opening in the container, and the thermal runaway termination agent comprises dodecafluoro-2-methylpentan-3-one; (d) providing a temperature sensitive tube containing an inert gas or a thermal runaway termination agent at a predetermined pressure and temperature suitable for normal operating conditions of the device, wherein the temperature sensitive tube has two ends, wherein (i) one end is in communication with the three-way control valve and the other end is capped, (ii) the temperature sensitive tube is located within the enclosure and comprises a temperature sensor for detection of a threshold temperature, and (iii) the temperature sensitive tube disposed in proximity to the lithium ion battery; (e) providing a nozzle-connecting tube which is in communication with the three-way control valve on one end and terminates in a nozzle proximal to the lithium ion battery at the other end of the nozzle-connecting tube; and (f) providing a heat stimulus, which generates a flame and initiates thermal runaway, whereupon the temperature sensitive tube ruptures, creating an opening in the temperature sensitive tube (heat stimulus-created opening) and causing release of the inert gas or thermal runaway termination agent within the temperature sensitive tube through the heat stimulus-created opening in the temperature sensitive tube and into the enclosure, resulting in a pressure drop within the temperature sensitive tube which actuates the three-way control valve to deliver the thermal runaway termination agent from the storage container through the three-way control valve to the nozzle-connecting tube, resulting in the release of the thermal runaway termination agent from the nozzle into the enclosure; wherein the delivery of the thermal runaway termination agent is characterized by a discharge time, a thermal runaway termination agent concentration, and hold time, thereby extinguishing the flame and terminating thermal runaway, and preventing reignition following the extinguishment of the flame.

The three-way control valve is in sensor communication with the temperature sensitive tube. In this embodiment, the temperature sensitive tube is in fluid communication with the source such that when the three-way control valve is actuated, the thermal runaway termination agent is delivered through a nozzle-connecting tube terminating in a nozzle proximal to the lithium ion battery, releasing the thermal runaway termination agent through the nozzle into the enclosure. In this embodiment, the temperature sensitive tube acts to detect the heat stimulus, and a nozzle-connecting tube acts to deliver the thermal runaway terminating agent into the enclosure.

In one method under Embodiment 2, in step (d), the temperature sensitive tube contains an inert gas. In an alternative method under Embodiment 2, in step (d), the temperature sensitive tube contains a thermal runaway termination agent.

Fire Protection System for Lithium Ion Battery

Embodiment 3

In certain embodiments of this disclosure, there is provided a fire protection system which comprises: (a) an enclosure; (b) a device, positioned within the enclosure, wherein the device comprises and is powered by a lithium ion battery; (c) a source of a thermal runaway termination agent, wherein the source comprises a container and a two-way control valve, wherein the container contains the thermal runaway termination agent, the two-way control valve is attached to an opening in the container, and the thermal runaway termination agent comprises dodecafluoro-2-methylpentan-3-one; (c) a temperature sensitive tube containing an inert gas or a thermal runaway termination agent at a predetermined pressure and temperature suitable for normal operating conditions of the device, wherein the tube has two ends, wherein (i) one end is in communication with the two-way control valve and the other end is capped, (ii) the tube is located within the enclosure and comprises a temperature sensor for detection of a threshold temperature, and (iii) the temperature sensitive tube is disposed in proximity to the lithium ion battery, and the temperature sensitive tube is burstable upon sensing a threshold temperature.

The two-way control valve is in sensor communication with the temperature sensitive tube in this embodiment. Further, in this embodiment, the temperature sensitive tube is in fluid communication with the source such that when the two-way control valve is actuated, the thermal runaway termination agent is delivered to the temperature sensitive tube. In this embodiment the temperature sensitive tube acts to both detect the heat stimulus and to deliver the thermal runaway termination agent into the enclosure.

In one fire protection system under Embodiment 3, the temperature sensitive tube of component (c) contains an inert gas. In an alternative fire protection system under Embodiment 3, the temperature sensitive tube of component (c) contains a thermal runaway termination agent.

Embodiment 4

There is also provided a fire protection system which comprises: (a) an enclosure; (b) a device, positioned within the enclosure, wherein the device comprises and is powered by a lithium ion battery; (c) a source of a thermal runaway termination agent, wherein the source comprises a container and a three-way control valve, wherein the container contains the thermal runaway termination agent, the three-way control valve is attached to an opening in the container, and the thermal runaway termination agent comprises dodecafluoro-2-methylpentan-3-one; (d) a temperature sensitive tube containing an inert gas or a thermal runaway termination agent at a predetermined pressure and temperature suitable for normal operating conditions of the device, wherein the tube has two ends, wherein (i) one end is in communication with the three-way control valve and the other end is capped, (ii) the tube is located within the enclosure and comprises a temperature sensor for detection of a threshold temperature, and (iii) the temperature sensitive tube disposed in proximity to the lithium ion battery, and the temperature sensitive tube is burstable upon sensing a threshold temperature; and (e) a nozzle-connecting tube which is in communication with the three-way control valve on one end and terminates in a nozzle proximal to the lithium ion battery at the other end of the nozzle-connecting tube.

The three-way control valve is in sensor communication with the temperature sensitive tube in this embodiment. Further, in this embodiment, the three-way control valve is in fluid communication with the nozzle-connecting tube such that when the three-way control valve is actuated, the thermal runaway termination agent is delivered to the nozzle-connecting tube. In this embodiment the temperature sensitive tube performs the functions of temperature sensor and actuator or actuating (activating) device of the three-way control valve but not as a delivery tube for the thermal runaway termination agent into the enclosure. The nozzle-connecting tube performs the function of delivery tube in this embodiment.

In one fire protection system under Embodiment 4, the temperature sensitive tube of component (c) contains an inert gas. In an alternative fire protection system under Embodiment 4, the temperature sensitive tube of component (c) contains a thermal runaway termination agent.

Terms used herein with particular meanings are provided below.

By "sensor communication" is meant herein a control valve is capable of receiving a signal generated by the temperature sensitive tube which results in actuating the control valve to open the container to release the thermal runaway termination agent from the container. The control valve is a two-way control valve or a three-way control valve, depending on the embodiment. The signal may be, for example, pneumatic or electronic.

In Embodiments 1 and 3, the two-way control valve is in sensor communication with the temperature sensitive tube. In Embodiments 2 and 4, the three-way control valve is in sensor communication with the temperature sensitive tube.

As used herein, a two-way control valve is a control valve having at least two ports. Thus, it is understood by one skilled in the art that a two-way control valve may have more than two ports. In Embodiments 1 and 3, a two-way control valve is meant to include a control valve having at least three ports. For example, a two-way control valve having a third port may be employed, where a third port provides an option for withdrawing a sample of the container contents.

Similarly, a three-way control valve is a control valve having at least three ports. Thus, it is understood by one skilled in the art that a three-way control valve may have more than three ports. In Embodiments 2 and 4, a three-way control valve is meant to include a control valve having at least four ports. For example, a three-way control valve having a fourth port may be employed, where a fourth port provides an option for withdrawing a sample of the container contents.

By "fluid communication" is meant a fluid is able to flow from the container through a control valve without interruption to either the temperature sensitive tube or to the nozzle-connecting tube.

In Embodiments 1 and 3, the two-way control valve is in fluid communication with the container and the temperature sensitive tube. In Embodiments 2 and 4, the three-way control valve is in fluid communication with the container and the nozzle-connecting tube.

More specifically, in Embodiment 1, rupture of the temperature sensitive tube in step (e) results in flow of the thermal runaway termination agent from the container through a two-way control valve to the temperature sensitive tube and into the enclosure. More specifically, in Embodiment 2, rupture of the temperature sensitive tube in step (f) results in flow of the thermal runaway termination agent from the container through a three-way control valve to a nozzle-connecting tube through a nozzle proximal to the lithium ion battery into the enclosure.

Sensor communication and fluid communication occur regardless of whether the source is positioned inside of or outside of the enclosure.

Device

A device powered by a lithium ion battery, as recited/provided in any of Embodiments 1, 2, 3 or 4, is any device powered by one or more lithium ion batteries. Examples of lithium ion battery-powered devices which are suitable for the methods and systems disclosed herein include datalogger, telecommunication equipment, personal electronic equipment, power tools, energy storage system, data center, electric motor vehicle, and electric bicycle. Personal electronic equipment includes cell phone, laptop computer and gaming system.

Battery

"Battery" as used herein means a container comprising at least one cell, in which chemical energy is converted into electricity and used as a source of power. A "cell" comprises a single anode and cathode separated by electrolyte used to produce a voltage and current. In a "battery bank" or "battery pack" two or more batteries may be arranged in parallel, in series, or in a combination of both when three or more batteries are present.

Lithium Ion Battery

"Lithium ion battery" or "LIB" as used herein, as recited/provided in any of Embodiments 1, 2, 3 or 4, means a battery which uses lithium ion chemistry and comprises an electrolytic cell having a lithium salt electrolyte. The lithium ion battery may be a single cell battery or a multiple cell battery or a battery bank comprising two or more lithium ion batteries.

A LIB comprises an anode chamber comprising an anode, a cathode chamber comprising a cathode, and a semipermeable membrane, which separates the anode chamber from the cathode chamber. The anode is constructed of graphite protected with a solid electrolyte interphase (SEI) layer. The cathode is constructed of a lithium metal oxide such as $LiCoO_2$, $LiFePO_4$, $LiMn_2O_4$ or $LiNiMnCoO_2$. The anode chamber and cathode chamber are each filled with a liquid electrolyte. The liquid electrolyte is typically a flammable organic carbonate such as ethylene carbonate or diethyl carbonate. The liquid electrolyte contains a lithium salt such as $LiPF_6$, $LiAsF_6$, $LiClO_4$, $LiBF_4$, or $LiCF_3SO_3$.

Enclosure

The lithium ion battery powered device is located within an enclosure. The enclosure is constructed of material of sufficient temperature- and pressure-resistance to contain within the enclosure a flame generated from the battery. The enclosure creates a physical barrier between the LIB-powered device and the area surrounding the enclosure.

Source of Thermal Runaway Termination Agent

A source of a thermal runaway termination agent is provided. The source comprises a storage container which stores the thermal runaway termination agent during normal operation. The source further comprises a control valve mounted on the container. The control valve can be a two-way control valve or a three-way control valve, depending on the embodiment.

In any of the embodiments disclosed herein, the source may be located within the enclosure.

Alternatively, in any of the embodiments disclosed herein, the source may be located outside of the enclosure. In such embodiments, the enclosure has an opening to provide sensor communication between the temperature sensitive tube and the control valve. When this embodiment is Embodiment 1 or Embodiment 3, the enclosure also has an opening to provide fluid communication between the two-way control valve and the temperature sensitive tube for delivery of the thermal runaway termination agent into the enclosure. When this embodiment is Embodiment 2 or Embodiment 4, the enclosure also has an opening to provide fluid communication between the three-way control valve and the nozzle-connecting tube. The openings for sensor communication and fluid communication in the enclosure are sealed to maintain integrity of the enclosure in the event of a heat stimulus.

Control Valve

In certain embodiments, which include Embodiment 1 and Embodiment 3, upon rupture of the temperature sensitive tube due to excessive heat caused by flame from a LIB fire, a two-way control valve permits discharge of the thermal runaway termination agent from the container through the temperature sensitive tube into the enclosure.

The two-way control valve is in sensor communication with the temperature sensitive tube. The two-way control valve can be any type of valve capable of receiving a signal from the temperature sensitive tube and being actuated by the signal. The signal is generated within the temperature sensitive tube upon rupture by a heat stimulus. Upon actuation, the two-way control valve opens fluid communication from the container through the valve and to the temperature sensitive tube to deliver the thermal runaway termination agent proximal to the lithium ion battery.

In such embodiments, the thermal runaway termination agent is delivered into the enclosure through the heat stimulus-created opening formed in the temperature sensitive tube. In such embodiments, the two-way control valve is in both sensor communication and fluid communication with the temperature sensitive tube.

In certain embodiments, which include Embodiment 2 and Embodiment 4, upon rupture of the temperature sensitive tube due to excessive heat caused by flame from a LIB fire, a three-way control valve permits discharge of the thermal runaway termination agent from the container through the valve to a nozzle-connecting tube into the enclosure.

The three-way control valve is in sensor communication with the temperature sensitive tube. The three-way control valve can be any type of valve capable of receiving a signal from the temperature sensitive tube and being actuated by the signal. The signal is generated within the temperature sensitive tube upon rupture by a heat stimulus. Upon actuation, the three-way control valve opens fluid communication from the container through the valve and to a nozzle-connecting tube to deliver the thermal runaway termination agent through a nozzle proximal to the lithium ion battery.

In such embodiments, the thermal runaway termination agent is delivered into the enclosure through the nozzle-connecting tube. In such embodiments, the three-way control valve is in sensor communication with the temperature sensitive tube and is in fluid communication with the nozzle-connecting tube.

Inert Gas

An inert gas as used herein comprises a gas chosen from nitrogen, argon, helium, carbon dioxide, and mixtures thereof. Optionally the inert gas further comprises the thermal runaway termination agent.

Thermal Runaway Termination Agent

The thermal runaway termination agent comprises dodecafluoro-2-methylpentan-3-one, or simply FK-5-1-12 in an amount sufficient to provide a concentration of at least 13% v/v (volume/volume) FK-5-1-12 when delivered to the enclosure for Embodiment 1 or 2.

In a preferred embodiment, the thermal runaway termination agent comprises FK-5-1-12 in an amount sufficient to provide a concentration of at least 18% v/v FK-5-1-12 when delivered to the enclosure for Embodiment 1 or 2.

The thermal runaway termination agent for any of Embodiments 1, 2, 3 or 4 may further comprise one or more inert gases. The inert gas may be chosen from nitrogen, argon, helium, carbon dioxide, and mixtures thereof.

The total pressure of the FK-5-1-12/inert gas mixture for any of Embodiments 1, 2, 3 or 4 is preferred to be 120 to 600 psig at 70° F. (0.8 to 4 MPa at 21° C.). Higher pressures may be used, with upper limits based on practicality among other reasons.

The thermal runaway termination agent may further comprise one or more halocarbon gases for any of Embodiments 1, 2, 3 or 4. The halocarbon gas may be chosen from 1,1,1,2,3,3,3-heptafluoropropane (HFC-227ea), pentafluoroethane (HFC-125), iodotrifluoromethane ($CF_3I$), trifluoromethane ($CHF_3$), 1,1,1,3,3,3-hexafluoroethane (HFC-236fa), E- or Z-1,1,1,4,4,4-hexafluoro-2-butene (E- or Z-HFO-1336mzz), E- or Z-1,3,4,4,4-pentafluoro-3-(trifluoromethyl)-1-butene (E- or Z-HFO-1438ezy), E- or Z-1-chloro-3,3,3-trifluoropropene (E- or Z-HCFO-1233zd), 2-chloro-3,3,3-trifluoropropene (HCFO-1233xf), E- or Z-1,3,3,3-tetrafluoropropene (E- or Z-HFO-1234ze), 2,3,3,3-tetrafluoropropene (HFO-1234yf), E- or Z-1-chloro-2,3,3,3-tetrafluoropropene (E- or Z-1224yd), or 2-bromo-3,3,3-trifluoropropene (HBFO-1233xfB).

Temperature Sensitive Tube

A temperature sensitive tube is located within the enclosure. The temperature sensitive tube is a pressure tube, meaning the tube contains or is filled with an inert gas or with a thermal runaway termination agent at a predetermined pressure. Temperature sensitive tubes are available commercially, for example from Rotarex, Luxembourg.

The predetermined pressure provided for the inert gas or thermal runaway termination agent within the temperature sensitive tube may vary to afford different tube burst temperatures. Higher pressure will result in tube burst at lower temperature whereas lower pressure will result in tube burst at higher temperature.

By "tube burst" is meant an increase in pressure of the inert gas or thermal runaway termination agent within the tube causes rupture of the tube upon the occurrence of a heat stimulus. In other words, the temperature sensitive tube is "burstable" upon sensing a threshold temperature.

The threshold temperature is the temperature at which the temperature sensitive tube will rupture. The threshold temperature is determined by the predetermined pressure provided for the inert gas or thermal runaway termination agent within the temperature sensitive tube, and on the particular formulation of the temperature sensitive tube. That is, the detailed composition of the temperature sensitive tube can be varied to provide different threshold temperatures for tube burst.

As further described herein below, the heat stimulus in the methods of Embodiment 1 or 2 may be a result of applied heat to the enclosure from an external heat source or from an internal heat source.

An external heat source is any source of heat, such as a hot engine or an external flame that is physically located outside of the enclosure.

An internal heat source may be the LIB itself, overheating due to a mechanical event or electrical event or a defect event, which, upon occurrence, generates heat within the enclosure. More information is provided below.

Once the tube bursts, the tube releases the inert gas or thermal runaway termination agent previously contained within. Furthermore, it will be appreciated by those skilled in the art that once the tube bursts, the inert gas or thermal runaway termination agent within the temperature sensitive tube will be released into the enclosure.

The temperature sensitive tube is disposed in the proximity to the lithium ion battery within the device within the enclosure such that heat released from the heat stimulus results in the rupture of the tube.

Rupture of the temperature sensitive tube results in forming an opening in the temperature sensitive tube, releasing inert gas or thermal runaway termination agent maintained in the temperature sensitive tube during normal operation into the enclosure. Rupture also generates a signal, e.g., from loss of pressure in the temperature sensitive tube, which is relayed to the control valve.

In Embodiment 1, the signal actuates a two-way control valve to release the thermal runaway termination agent from the storage container, through the two-way control valve, into the temperature sensitive tube, and out through the heat stimulus-created opening in the heat sensitive tube, providing flame extinguishment and termination of thermal runaway, and preventing reignition following initial extinguishment of flames. In this embodiment, the temperature sensitive tube performs the functions of temperature sensor, actuator or actuating device of the two-way control valve and delivery tube for the thermal runaway termination agent into the enclosure.

In Embodiment 2, the signal generated by rupture of the tube is relayed to a three-way control valve, which actuates the three-way control valve to release the thermal runaway termination agent from the container through the three-way control valve to a nozzle-connecting tube. The nozzle-connecting tube is separate from the temperature sensitive tube. In this embodiment, the nozzle-connecting tube has a nozzle at the end distal to the three-way control valve inside of the enclosure. In this embodiment, the temperature sensitive tube performs the functions of temperature sensor and actuator or actuating device of the three-way control valve but not as a delivery tube for the thermal runaway termination agent into the enclosure. The nozzle-connecting tube performs the function of delivery tube in this embodiment.

Normal Operating Conditions

By "normal operating conditions" is meant herein, the device powered by a lithium ion battery is operating under conditions of temperature, pressure and environmental factors that do not cause the temperature sensitive tube to burst.

Heat Stimulus

A heat stimulus as recited/provided in Embodiments 1 and 2, is an event which causes heat generation within the enclosure so that the LIB ignites resulting in flame and thermal runaway within the device. The heat stimulus may be a mechanical event, a thermal event, an electrical event or a defect event.

A description of a typical LIB thermal runaway event can be found in Chapter 3.9.3 of "Lithium-Ion Battery Chemistries," John T. Warner [Elsevier 2019]. It is understood by those skilled in the art that the temperatures indicated in this description are not exact numbers because the exact temperatures depend on cell design and chemistry, however the sequence of events involved in thermal runaway are similar for the different designs of LIBs, as discussed below.

Thermal runaway occurs when temperature within a LIB cell has risen beyond the temperature of normal operating conditions such that chain reactions are initiated within the cell, which are self-sustaining due to uncontrolled temperature increases and oxygen generation.

According to Warner, once temperature of the cell reaches about a protective solid electrolyte interphase (SEI) layer on the anode begins to decompose and break down in an exothermic reaction (generating heat) due to the reaction of the lithium with electrolyte solvent. At about 100° C.-120°

C., electrolyte (typically organic carbonates, which are flammable) begins to break down in another exothermic reaction, which in turn generates various gases such as $CO_2$ and hydrocarbons within the cell. As the temperature nears 120° C.-130° C., the separator between the anode and cathode melts allowing contact between the anode and cathode causing an internal short circuit and generating more heat. As the temperature continues to rise, at about 130° C.-150° C., the cathode begins breaking down in another exothermic chemical reaction with the electrolyte which also generates oxygen.

Release of oxygen from breakdown of the cathode and contact with the flammable electrolyte generates fire (flames) in of the cell. The breakdown of the cathode is also a highly exothermic reaction generating a substantial amount of heat and continuing to drive the cell toward ultimate failure and further enhancing fire at the cell.

When temperatures rise above 150° C.-180° C. the chain reactions may become self-sustaining if the cell is not able to rapidly dissipate the heat being generated. At this point the cell is in what is referred to as "thermal runaway" as temperature increases and oxygen generation makes the fire self-sustaining. If gases continue to build up within the cell the cell may rupture or vent through a safety valve. The cell may rupture or vent the flammable hydrocarbon gases and hydrofluorocarbon electrolytes at this point. The introduction of a spark can ignite the electrolyte and the gases causing flame, fire, and potentially an explosion.

By "mechanical event" is meant there is a physical damage to the LIB such as penetration by a sharp or blunt object, crushing by a weighted object, automotive collision.

By "thermal event" is meant the LIB is exposed to a temperature which causes deterioration of the LIB. The source of the temperature may be internal, such as a loose connection causing the LIB to overheat from the inside, or external, such as a nearby heat source, an external flame or loss of climate control in a climate controlled area.

By "electrical event" is meant the LIB experiences an issue interfering with or interrupting the normal flow of electrons through the LIB, such as due to a short circuit or overcharging.

By a "defect event" is meant the design or manufacture (e.g., insufficient quality control, poor insulation, loose connections) of the LIB introduced a flaw that failed to protect the LIB from short circuiting or heat generation during normal operation.

Two or more of a mechanical event, a thermal event, an electrical event or a defect event may be coupled causing the heat stimulus. For example, in one embodiment, a short circuit (electrical event) may cause the LIB to overheat (thermal event) resulting in a coupled event as the heat stimulus. In another embodiment, a mechanical event, such as a puncture or penetration of the LIB may cause a short circuit (electrical event) leading to rapid heating (thermal event) as the heat stimulus. In another embodiment, a loose connection (defect event) may lead to overheating (thermal event) as the heat stimulus. The aforementioned embodiments are merely examples and not intended to be exhaustive.

Upon the occurrence of a heat stimulus, the temperature sensitive tube bursts, thus releasing inert gas or thermal runaway termination agent into the enclosure.

The thermal runaway termination agent is released at specified discharge time, agent concentration, and hold time, thereby terminating both flame and thermal runaway, and preventing reignition following initial extinguishment of flames. The generally accepted definitions of agent concentration, discharge time, and hold time are understood by those skilled in the art as provided in NFPA 2001 Standard for Clean Agent Fire Protection Systems, available at https://www.nfpa.org/codes-and-standards/all-codes-and-standards/list-of-codes-and-standards/detail?code=2001.

The thermal runaway termination agent is released into the enclosure at a specified discharge time, agent concentration and hold time, each being sufficient to extinguish any flame that may be present as well as to terminate thermal runaway. The thermal runaway termination agent release is also provided such that the hold time is sufficient to cool the enclosure and the LIB to a temperature sufficient to prevent re-ignition.

In a preferred embodiment for either Embodiment 1 or Embodiment 2, the thermal runaway termination agent comprises FK-5-1-12 in an amount sufficient to provide a concentration of from 13% to 30% v/v when delivered to the enclosure. In an alternative embodiment for either Embodiment 1 or Embodiment 2, the thermal runaway termination agent comprises FK-5-1-12 in an amount sufficient to provide a concentration of from 18% to 28% v/v. In another, the thermal runaway termination agent comprises FK-5-1-12 in an amount sufficient to provide a concentration of from 20% to 25% v/v.

In a preferred embodiment for either Embodiment 1 or Embodiment 2, the discharge time ranges from 18 seconds to 180 seconds, or from 25 to 120 seconds and or from 45 to 120 seconds. By "discharge time" it is meant herein, the time from the start of agent delivery into the enclosure to the time at which 95% of the agent has been delivered into the enclosure.

In a preferred embodiment for either Embodiment 1 or Embodiment 2, the hold time ranges from 10 to 15 minutes, or from 15 to 30 minutes, or from to 60 minutes. By "hold time" it is meant herein the time period over which the agent concentration in the enclosure remains at the desired concentration (over time, agent can slowly leak from small openings in the enclosure, e.g., vents, louvres, etc.).

In one embodiment of either Embodiment 1 or Embodiment 2, the discharge time is at least 18 seconds and the thermal runaway termination agent comprises FK-5-1-12 in an amount sufficient to provide a concentration of at least 13% v/v FK-5-1-12 to provide flame extinguishment, terminating thermal runaway in single or multiple cell configurations and cooling sufficient to prevent reignition. Longer discharge times and higher concentrations may be used, with upper limits based on practicality among other reasons.

DETAILED DESCRIPTION OF THE FIGURES

Figure 1B:
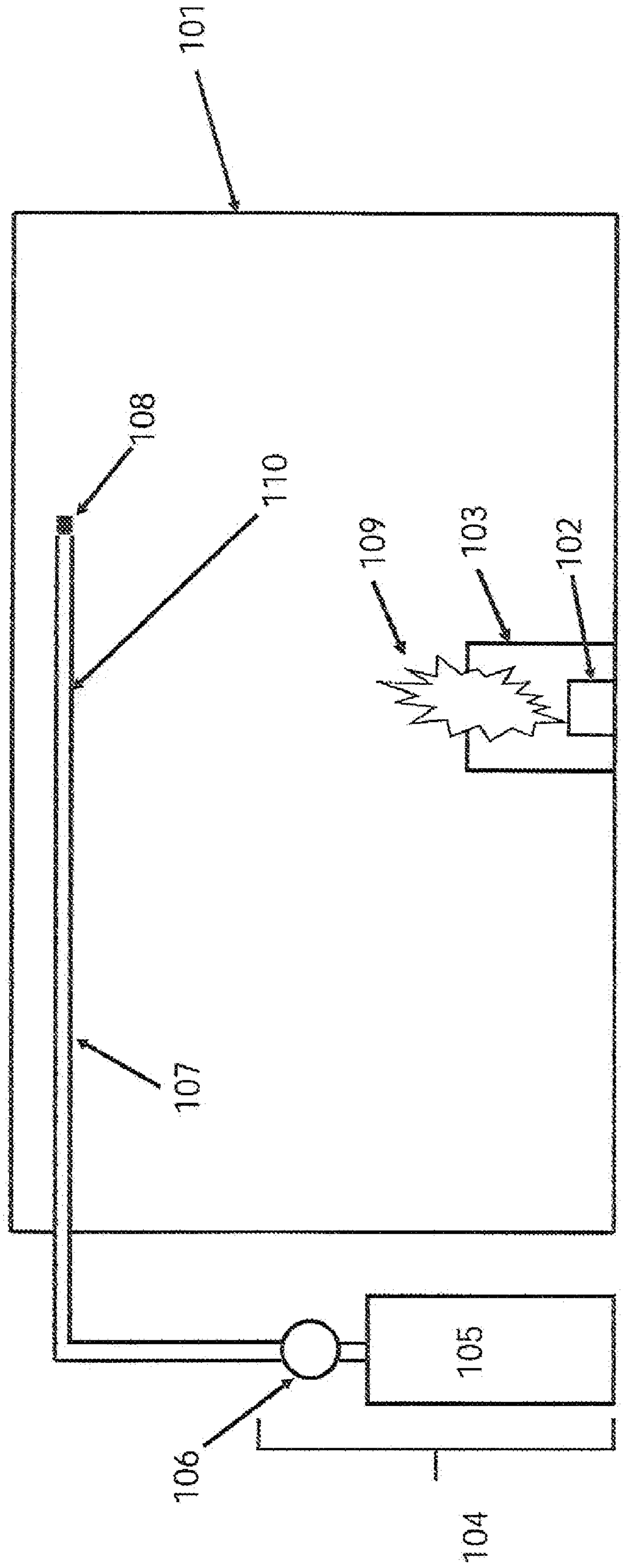

FIGS. 1*a* and 1*b* are illustrations of a LIB protection system disclosed herein used in a method for extinguishing a flame and terminating thermal runaway in a device powered by a lithium ion battery as disclosed herein. Enclosure 101 is a hazard area that may experience a lithium ion battery (LIB) fire originating in LIB 102 located in a LIB-powered device 103. The LIB fire protection system includes a source of thermal runaway termination agent 104, comprising thermal runaway termination agent container 105 and two-way control valve 106, which is connected to thermal runaway termination agent container 105 and to temperature sensitive tube. Temperature sensitive tube 107 has an end which is sealed off via tube end seal 108. Temperature sensitive tube 107 is pressurized to a desired pressure with inert gas or thermal runaway termination agent. In the event of a fire 109 originating in LIB-powered device 103, the portion of the temperature sensitive tube 107 where maximum heat (threshold temperature) is detected ruptures (see FIG. 1*b*), forming a heat stimulus-created opening 110, releasing the inert gas or thermal runaway termination agent from within temperature sensitive tube 107 into enclosure 101, and simultaneously resulting in a pressure drop within temperature sensitive tube 107 which activates control valve 106 to deliver the thermal runaway termination agent from thermal runaway termination agent storage container 105 through control valve 106, into temperature sensitive tube 107, out of the heat stimulus-created opening 110 (see FIG. 1*b*) into temperature sensitive tube 107 and into enclosure 101. Release of the thermal runaway termination agent into enclosure 101 results in flame extinguishment and the termination of thermal runaway in the LIB-powered device 103 and prevents reignition following initial extinguishment of flames.

FIG. 1*b* is the same as FIG. 1*a*, with the exception that in FIG. 1*b*, temperature sensitive tube 107 has ruptured, due to flame 109 and heat stimulus-created opening 110 is seen.

In the LIB fire protection system illustrated in FIGS. 1*a* and 1*b*, the temperature sensitive tube 107 performs the functions of temperature sensor (also considered fire detection device), actuator or actuating device (also considered system activation device) of the two-way control valve and delivery tube for the thermal runaway termination agent into the enclosure.

Figure 2:
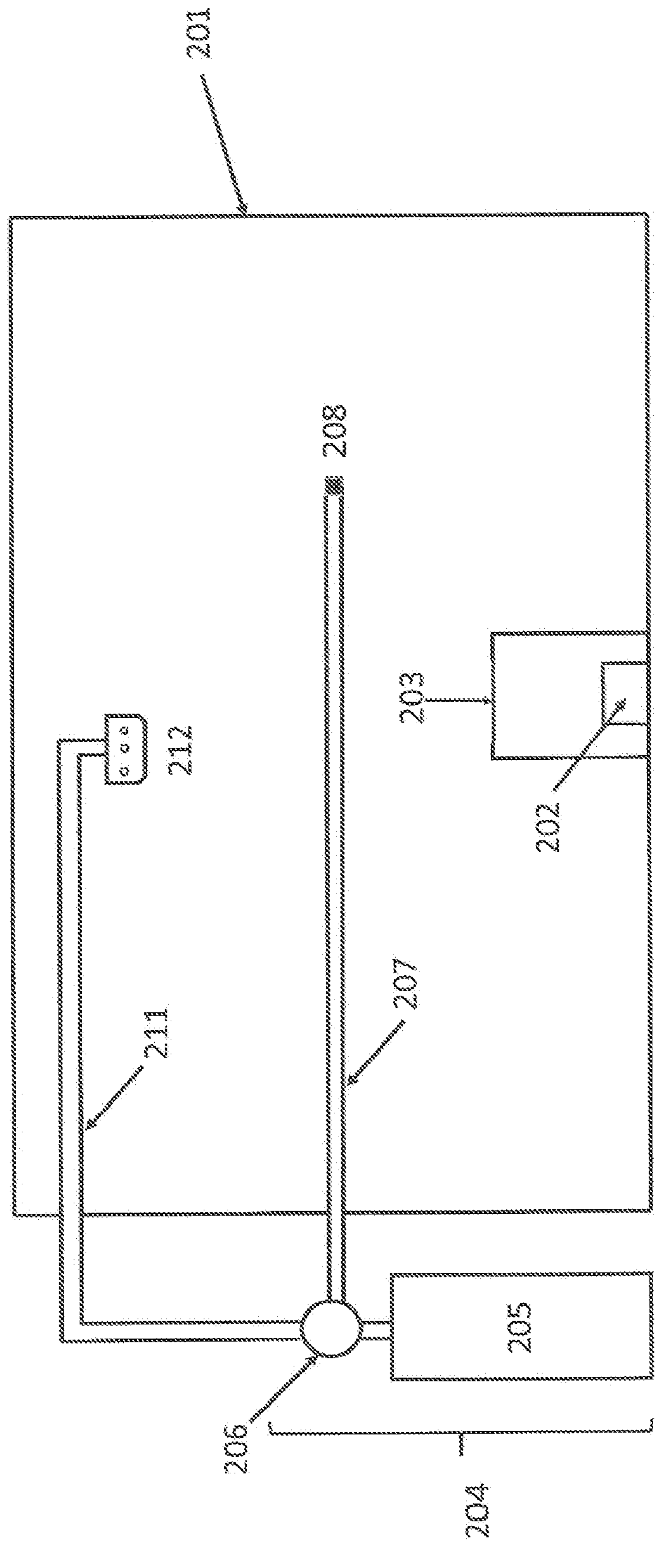
FIG. 2 is an illustration of a second embodiment of a LIB protection system of the present disclosure.

FIG. 2 is an illustration of a LIB protection system disclosed herein used in a method for extinguishing a flame and terminating thermal runaway in a device powered by a lithium ion battery as disclosed herein. Enclosure 201 is a hazard area that may experience a lithium-ion battery (LIB) fire originating in LIB 202 located inside LIB-powered device 203. The LIB fire protection system includes source of thermal runaway termination agent 204, which comprises thermal runaway termination agent container 205 and three-way control valve 206, which is connected to thermal runaway termination agent container 205 and to temperature sensitive tube 207, the end of which is sealed off via tube end seal 208. Temperature sensitive tube 207 is pressurized to a desired pressure with inert gas or thermal runaway termination agent. Nozzle-connecting tube 211 connects to three-way control valve 206 and terminates at delivery nozzle 212. In the event of a fire originating in LIB-powered device 203, the portion of temperature sensitive tube 207 where maximum heat (threshold temperature) is detected ruptures, releasing the inert gas or thermal runaway termination agent within temperature sensitive tube 207 into enclosure 201, and simultaneously resulting in a pressure drop within temperature sensitive tube 207 which activates three-way control valve 206 to divert flow from temperature sensitive detection tube 207 to nozzle-connecting tube 211, delivering the thermal runaway termination agent from thermal runaway termination agent storage container 205 through three-way control valve 206, into nozzle-connecting tube 211 and out from delivery nozzle 212. Release of the thermal runaway termination agent into enclosure 201 results in flame extinguishment and termination of thermal runaway in LIB-powered device 203 and prevents reignition following initial extinguishment of flames.

In the LIB fire protection system illustrated in FIG. 2, the temperature sensitive tube 207 performs the functions of temperature sensor (also considered fire detection device), actuator or actuating device (also considered system activation device) of the control valve 206, but not as a delivery tube for the thermal runaway termination agent into enclosure 201. Nozzle-connecting tube 211 performs the function of delivery tube with delivery nozzle 212.

Figure 3:
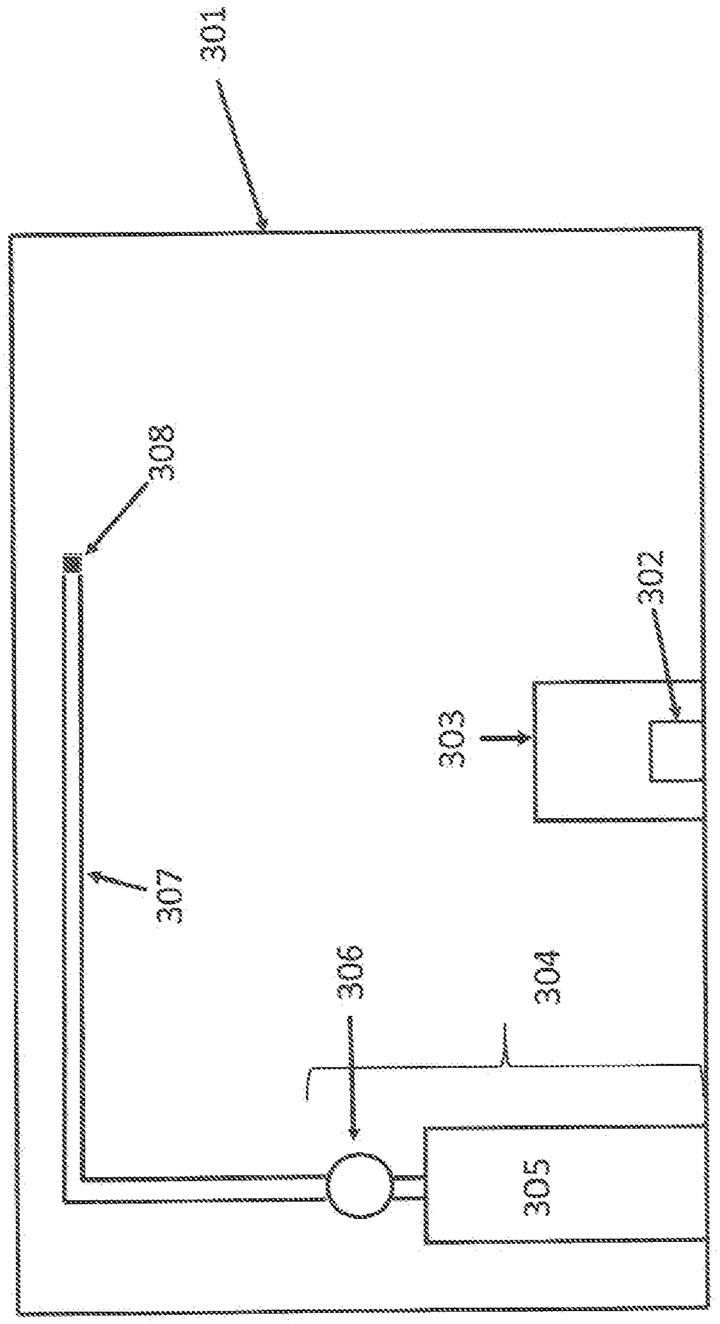
FIG. 3 is an illustration of a third embodiment of a LIB protection system of the present disclosure.

FIG. 3 is an illustration of a LIB protection system disclosed herein used in a method for extinguishing a flame and terminating thermal runaway in a device powered by a lithium ion battery as disclosed herein, wherein the thermal runaway termination container is located inside enclosure 301, as opposed to being located outside the enclosure. Enclosure 301 is a hazard area that may experience a lithium-ion battery (LIB) fire originating in a LIB 302 located inside LIB-powered device 303. The LIB fire protection system includes a source of thermal runaway termination agent 304, comprising thermal runaway termination agent container 305 and two-way control valve 306, which is connected to thermal runaway termination agent container 305 and to temperature sensitive tube 307, the end of which is sealed off via tube end seal 308. Temperature sensitive tube 307 is pressurized to a desired pressure with inert gas or thermal runaway termination agent. In the event of a fire originating in LIB-powered device 303, the portion of temperature sensitive tube 307 where maximum heat (threshold temperature) is detected ruptures, forming an opening, releasing the inert gas or thermal runaway termination agent from within temperature sensitive tube 307 into enclosure 301, and simultaneously resulting in a pressure drop within temperature sensitive tube 307, which activates two-way control valve 306 to deliver thermal runaway termination agent from thermal runaway termination agent storage container 305 through two-way control valve 306, into temperature sensitive tube 307, out of a heat stimulus created opening in temperature sensitive tube and into the enclosure 301. Release of the thermal runaway termination agent into the enclosure 301 results in flame extinguishment and the termination of thermal runaway in the LIB powered device 303 and prevents reignition following initial extinguishment of flames.

FIG. 3 is similar to FIGS. 1*a* and 1*b*. In the LIB fire protection system illustrated in FIG. 3, the temperature sensitive tube 307 performs the functions of temperature sensor (also considered fire detection device), actuator or actuating device (also considered system activation device) of the control valve and delivery tube for the thermal runaway termination agent into the enclosure.

Figure 4:
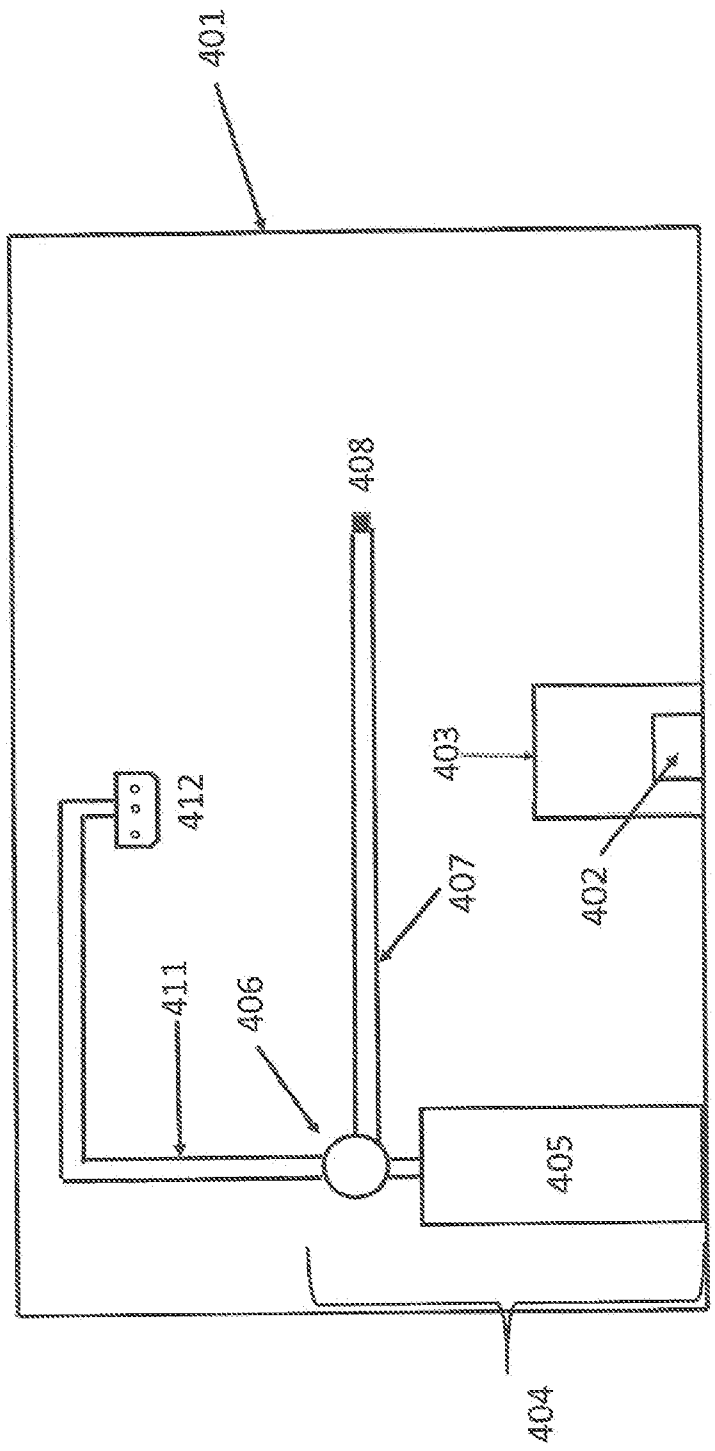
FIG. 4 is an illustration of a fourth embodiment of a LIB protection system of the present disclosure.

FIG. 4 is an illustration of a LIB protection system disclosed herein used in a method for extinguishing a flame and terminating thermal runaway in a device powered by a lithium ion battery as disclosed herein, wherein the thermal runaway termination container is located inside enclosure 401, as opposed to being located outside the enclosure.

Enclosure 401 is a hazard area that may experience a lithium-ion battery (LIB) fire originating in LIB 402 located inside a LIB-powered device 403. The LIB fire protection system includes a source of thermal runaway termination agent 404, which comprises thermal runaway termination agent container 405 and three-way control valve 406, which is connected to thermal runaway termination agent container 405 and to temperature sensitive tube 407, the end of which is sealed off via tube end seal 408. Temperature sensitive tube 407 is pressurized to a desired pressure with inert gas or thermal runaway termination agent. Nozzle connecting tube 411 connects to three-way control valve 406 and terminates at delivery nozzle 412. In the event of a fire originating in LIB-powered device 403, the portion of the temperature sensitive tube 407 where maximum heat (threshold temperature) is detected ruptures, releasing the inert gas or thermal runaway termination agent within temperature sensitive tube 407 into enclosure 401, and simultaneously resulting in a pressure drop within temperature sensitive tube 407 which activates three-way control valve 406 to divert flow from temperature sensitive detection tube 407 to nozzle-connecting tube 411, delivering the thermal runaway termination agent from thermal runaway termination agent storage container 405 through three-way control valve 406, into nozzle-connecting tube 411 and out from delivery nozzle 412. Release of the thermal runaway termination agent into enclosure 401 results in flame extinguishment and termination of thermal runaway in LIB-powered device 403 and prevents reignition following initial extinguishment of flames.

FIG. 4 is similar to FIG. 2. In the LIB fire protection system illustrated in FIG. 4, the temperature sensitive tube 407 performs the functions of temperature sensor (also considered fire detection device), actuator or actuating device (also considered system activation device) of the control valve 406, but not as a delivery tube for the thermal runaway termination agent into enclosure 401. Nozzle-connecting tube 411 performs the function of delivery tube with delivery nozzle 412.

Figure 5:
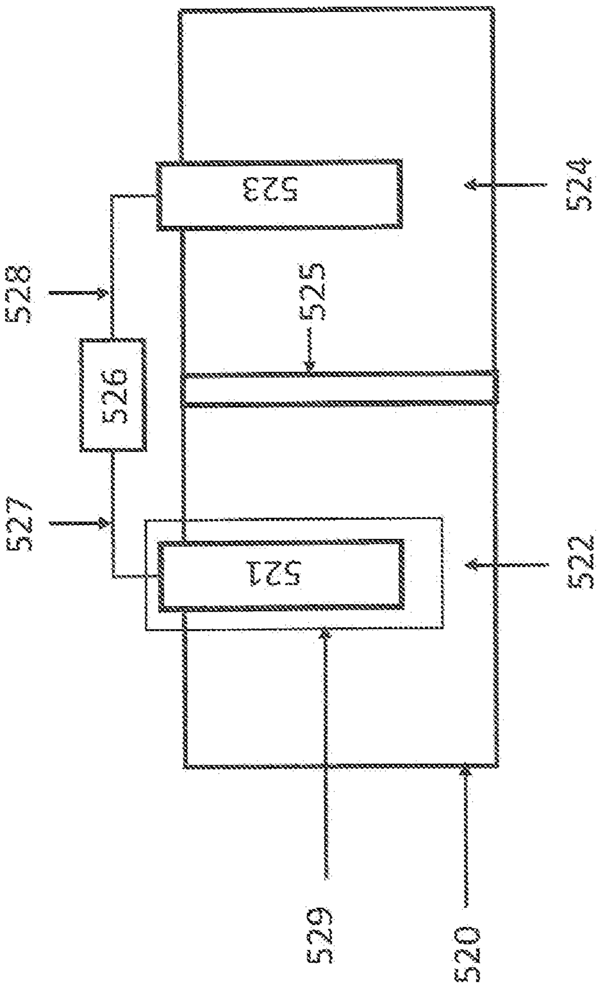
FIG. 5 is an illustration of a typical lithium ion battery (LIB).

FIG. 5 is a schematic diagram of a typical lithium-ion battery (LIB). The LIB is comprised of outer casing 520 in which are located anode 521 located in anode chamber 522 of the LIB, and cathode 523 located in cathode chamber 524 of the LIB. Anode chamber 522 and cathode chamber 524 are separated by semipermeable membrane separator 525. Anode 521 is connected to load 526 via anode-to-load connection 527, and cathode 523 is connected to load 526 via cathode-to-load connection 528. Anode 521 is protected with a solid electrolyte interphase (SEI) layer 529. Anode chamber 522 and cathode chamber 524 are both filled with a liquid electrolyte, not illustrated.

EXAMPLES

Materials

A 6700 mAh lithium ion power pack and aluminum-cased 3.2 V DC $LiFePO_4$ lithium ion polymer batteries are available commercially from multiple sources, including Duracell, Ravpower, and Tenergy. A Rotarex direct low-pressure valve, a Rotarex pressure switch, Rotarex FireDETEC temperature sensitive tube and Rotarex end-of-line adapter are all available from Rotarex S.A., Luxembourg. A Harbin Coslight model GYFP4875T datalogger is available from Harbin Coslight Storage Battery Co., Ltd., Heilongjiang, China.

Dodecafluoro-2-methylpentan-3-one is available as 3M™ Novec™ 1230 fire protection fluid, from 3M, St. Paul, MN.

Example 1 (Comparative). Freeburn Test: Initiation of Thermal Runaway in Power Pack Via Mechanical Failure Thermal runaway was initiated in a plastic-cased 6700 mAh lithium ion power pack via mechanical damage. A weighted plunger equipped with a piercing tip was dropped through a guide pipe onto the power pack which was located in a 1.15 $m^3$ steel test enclosure equipped with an observation window and closed circuit television (CCTV). Upon piercing of the battery, flaming and thermal runaway occurred, which lasted for approximately 15 minutes.

Example 2 (Comparative). Freeburn Test: Initiation of Thermal Runaway in 3.2 V DC $LiFePO_4$ Battery Via Mechanical Failure The procedure of Example 1 was repeated to initiate thermal runaway in an aluminum-cased 3.2 V DC $LiFePO_4$ lithium ion polymer battery. Upon piercing the battery, flaming and thermal runaway occurred, which lasted for approximately 15 minutes.

Example 3. Suppression of Lithium Ion Battery Fire and Thermal Runaway: Mechanical Damage The procedure of Example 2 is repeated with the addition of a protection system installed in the test enclosure. The protection system consists of (1) a fire extinguishing agent storage container containing FK-5-1-12 fire extinguishing agent (for delivery of FK-5-1-12 agent concentration of 19.3%), (2) a Rotarex direct low pressure valve located on the storage cylinder, (3) a Rotarex pressure switch located on the low pressure valve, (4) a length of Rotarex FireDETEC temperature sensitive tube pressurized to 15 bar with nitrogen located approximately 6 inches above the lithium ion battery, and (5) a Rotarex end of line adapter affixed to the end of the heat sensing tube. Upon piercing of the battery by the weighted plunger device, thermal runaway occurs as evidenced by flaming. After the initiation of thermal runaway the system self-activates, releasing the FK-5-1-12 agent and all flaming is extinguished. No reignition occurs after a 15 minute hold time and no reignition occurs upon opening of the test enclosure and exposure of the test enclosure contents to air.

Example 4. Suppression of Lithium Ion Battery Fire and Thermal Runaway: Overcharged/Overheated Battery Suppression tests are conducted on a lithium ion battery fire occurring in a Harbin Coslight model GYFP4875T datalogger, powered by a battery pack consisting of twelve aluminum-cased 3.2 V DC $LiFePO_4$ lithium ion polymer batteries connected in series. The datalogger is located in a 1 $m^3$ 2 bay outdoor cabinet (ODC) equipped with an observation window and a protection system. The protection system consists of (1) a fire extinguishing agent storage container containing FK-5-1-12 fire extinguishing agent, (2) a Rotarex direct low pressure valve located on the storage cylinder, (3) a Rotarex pressure switch located on the low pressure valve, (4) a length of Rotarex FireDETEC heat sensing tube pressurized to 15 bar with nitrogen located approximately 6 inches above the lithium ion battery, and (5) a Rotarex end of line adapter affixed to the end of the heat sensing tube. Eleven batteries are charged to 100% state of charge and one battery is overcharged through the application of 3.4 to 3.6 volts (100-110 A); after 11 minutes of overcharging a heater located on the overcharged cell is turned on to provide additional heating until thermal runaway commences, as evidenced by flaming. After 2 minutes the system self-activates, releasing the FK-5-1-12 agent and all flaming is extinguished. No reignition occurs after a 15 minute hold time and no reignition occurs upon opening of the test enclosure and exposure of the test enclosure contents to air.

What is claimed is:

1. A method for extinguishing a flame and terminating thermal runaway in a device powered by a lithium ion battery, which comprises: (a) providing an enclosure; (b) providing a device positioned within the enclosure, wherein the device comprises and is powered by a lithium ion battery; (c) providing a source of a thermal runaway termination agent, wherein the source comprises a container and a two-way control valve, wherein the container contains the thermal runaway termination agent, the two-way control valve is attached to an opening in the container, and the thermal runaway termination agent comprises dodecafluoro-2-methylpentan-3-one; (d) providing a temperature sensitive tube containing an inert gas or a thermal runaway termination agent at a predetermined pressure and temperature suitable for normal operating conditions of the device, wherein the tube has two ends, wherein (i) one end is in communication with the control valve and the other end is capped, (ii) the tube is located within the enclosure and comprises a temperature sensor for detection of a threshold temperature, and (iii) the tube is disposed in proximity to the lithium ion battery; and (e) providing a heat stimulus, which generates a flame and initiates thermal runaway, whereupon the temperature sensitive tube ruptures, creating an opening in the temperature sensitive tube and causing release of the inert gas or thermal runaway termination agent within the temperature sensitive tube through the heat stimulus-created opening in the temperature sensitive tube and into the enclosure, resulting in a pressure drop within the temperature sensitive tube which actuates the control valve to deliver the thermal runaway termination agent from the storage container through the control valve to the temperature sensitive tube and out of the heat stimulus-created opening in the temperature sensitive tube and into the enclosure; wherein the delivery of the thermal runaway termination agent is characterized by a discharge time, a thermal runaway termination agent concentration, and hold time, thereby extinguishing the flame and terminating thermal runaway and preventing reignition following the extinguishment of the flame wherein the discharge time comprises at least 18 seconds and the thermal runaway termination agent comprises the dodecafluoro-2-methylpentan-3-one in an amount sufficient to provide a concentration of at least 13% v/v of the dodecafluoro-2-methylpentan-3-one.

2. The method of claim 1 wherein the temperature sensitive tube contains an inert gas or a thermal runaway termination agent in step (d).

3. The method of claim 2 wherein the temperature sensitive tube contains an inert gas and wherein the inert gas is chosen from nitrogen, argon, helium, carbon dioxide, and mixtures thereof.

4. The method of claim 1, wherein the two-way control valve has at least three ports.

5. The method of claim 1, wherein the device is chosen from datalogger, telecommunication equipment, personal electronic equipment, power tool, energy storage system, data center, electric motor vehicle, and electric bicycle.

6. The method of claim 1, wherein the lithium ion battery comprises an anode chamber comprising an anode, a cathode chamber comprising a cathode and a semipermeable membrane, which separates the anode chamber from the cathode chamber and wherein the anode is constructed of graphite protected with a solid electrolyte interphase layer and the cathode is constructed of a lithium metal oxide chosen from $LiCoO_2$, $LiFePO_4$, $LiMn_2O_4$ or $LiNiMnCoO_2$ and wherein the anode chamber and cathode chamber are each filled with a liquid electrolyte which is a flammable organic carbonate chosen from ethylene carbonate or diethyl carbonate, which contains a lithium salt chosen from $LiPF_6$, $LiAsF_6$, $LiClO_4$, $LiBF_4$, or $LiCF_3SO_3$.

7. The method of claim 1, wherein the heat stimulus is the result of applied heat to the enclosure from an external source.

8. The method of claim 1, wherein the heat stimulus is the result of applied heat to the enclosure from an internal source and wherein the internal source is due to the LIB overheating due to a mechanical event or electrical event or a defect event.

9. The method of claim 1, wherein the amount the thermal runaway termination agent of the dodecafluoro-2-methylpentan-3-one sufficient to provide the concentration up to 30% v/v of the dodecafluoro-2-methylpentan-3-one when delivered to the enclosure.

10. The method of claim 1, wherein the discharge time comprises up to 180 seconds.

11. The method of claim 1 wherein the hold time ranges from 10 to 15 minutes.

12. The method of claim 1, wherein the hold time ranges from 10 to 15 minutes.

13. A method for extinguishing a flame and terminating thermal runaway in a device powered by a lithium ion battery, which comprises: (a) providing an enclosure; (b) providing a device positioned within the enclosure, wherein the device comprises and is powered by a lithium ion battery; (c) providing a source of a thermal runaway termination agent, wherein the source comprises a container and a two-way control valve, wherein the container contains the thermal runaway termination agent, the two-way control valve is attached to an opening in the container, and the thermal runaway termination agent comprises dodecafluoro-2-methylpentan-3-one; (d) providing a temperature sensitive tube containing an inert gas or a thermal runaway termination agent at a predetermined pressure and temperature suitable for normal operating conditions of the device, wherein the tube has two ends, wherein (i) one end is in communication with the control valve and the other end is capped, (ii) the tube is located within the enclosure and comprises a temperature sensor for detection of a threshold temperature, and (iii) the tube is disposed in proximity to the lithium ion battery; and (e) providing a heat stimulus, which generates a flame and initiates thermal runaway, whereupon the temperature sensitive tube ruptures, creating an opening in the temperature sensitive tube and causing release of the inert gas or thermal runaway termination agent within the temperature sensitive tube through the heat stimulus-created opening in the temperature sensitive tube and into the enclosure, resulting in a pressure drop within the temperature sensitive tube which actuates the control valve to deliver the thermal runaway termination agent from the storage container through the control valve to the temperature sensitive tube and out of the heat stimulus-created opening in the temperature sensitive tube and into the enclosure; wherein the delivery of the thermal runaway termination agent is characterized by a discharge time, a thermal runaway termination agent concentration, and hold time, thereby extinguishing the flame and terminating thermal runaway and preventing reignition following the extinguishment of the flame, wherein the thermal runaway termination agent concentration the dodecafluoro-2-methylpentan-3-one in an amount sufficient to provide a concentration of at least 13% v/v dodecafluoro-2-methylpentan-3-one into the enclosure and the hold time comprises from 10 to 60 minutes.

* * * * *